(12) United States Patent
Boisseau et al.

(10) Patent No.: US 6,685,985 B2
(45) Date of Patent: Feb. 3, 2004

(54) METHOD OF IMPROVING THE APPEARANCE OF COATED ARTICLES HAVING BOTH VERTICAL AND HORIZONTAL SURFACES, AND COATING COMPOSITIONS FOR USE THEREIN

(75) Inventors: John E. Boisseau, Bloomfield Hills, MI (US); Mark Kowalewski, Chesterfield Township, MI (US); Kurt D. Hoffman, Sterling Heights, MI (US); Dustin Clinard, Bloomfield Hills, MI (US)

(73) Assignee: BASF Corporation, Southfield, MI (US)

( * ) Notice: Subject to any disclaimer, the term of this patent is extended or adjusted under 35 U.S.C. 154(b) by 59 days.

(21) Appl. No.: 09/779,948

(22) Filed: Feb. 9, 2001

(65) Prior Publication Data

US 2002/0155278 A1 Oct. 24, 2002

(51) Int. Cl.⁷ .................................................. B05D 3/02
(52) U.S. Cl. ..................................... 427/180; 427/385.5
(58) Field of Search ............................. 427/385.5, 180

(56) References Cited

U.S. PATENT DOCUMENTS

| | | | |
|---|---|---|---|
| 3,547,848 A | 12/1970 | Marsh et al. ................. 260/22 |
| 3,893,956 A | 7/1975 | Brandt ........................ 260/18 |
| 4,169,930 A | 10/1979 | Blount ........................ 528/38 |
| 4,246,382 A | 1/1981 | Honda et al. ................. 526/79 |
| 4,311,622 A | 1/1982 | Buter ........................ 524/542 |
| 4,383,068 A | 5/1983 | Brandt ........................ 524/196 |
| 4,416,941 A | 11/1983 | Barsotti ...................... 428/328 |
| 4,425,468 A | 1/1984 | Makhlouf et al. .......... 524/710 |
| 4,444,954 A | 4/1984 | Mels et al. ................... 525/124 |
| 4,489,135 A | 12/1984 | Drexler et al. ............ 428/423.1 |
| 4,522,958 A | 6/1985 | Das et al. ................... 523/212 |
| 4,528,319 A | 7/1985 | Ottaviani et al. .......... 524/540 |
| 4,565,730 A | 1/1986 | Poth et al. ................... 428/204 |
| 4,647,647 A | 3/1987 | Haubennestel et al. ........ 528/83 |
| 4,677,028 A | 6/1987 | Heeringa et al. ......... 428/422.8 |
| 4,710,542 A | 12/1987 | Forgione et al. ............ 525/127 |
| 4,754,014 A | 6/1988 | Ryntz et al. ................... 528/28 |
| 4,762,752 A | 8/1988 | Haubennestel et al. ..... 428/407 |
| 4,851,294 A | 7/1989 | Buter et al. .............. 428/425.8 |
| 4,851,460 A | 7/1989 | Stranghoner et al. ........ 524/204 |
| 4,880,867 A | 11/1989 | Gobel et al. ................. 524/507 |
| 4,895,910 A | 1/1990 | Isozaki et al. ............ 525/326.5 |
| 4,914,148 A | 4/1990 | Hille et al. ................. 524/507 |
| 4,939,213 A | 7/1990 | Jacobs, III et al. ....... 525/329.9 |
| 4,945,128 A | 7/1990 | Hille et al. ................. 524/591 |
| 4,965,317 A | 10/1990 | Kania et al. |
| 5,075,372 A | 12/1991 | Hille et al. ................. 524/839 |
| 5,079,312 A | 1/1992 | Isozaki et al. .............. 525/479 |
| 5,084,541 A | 1/1992 | Jacobs, III et al. .......... 528/45 |
| 5,086,087 A | 2/1992 | Misev ......................... 522/84 |
| 5,102,746 A | 4/1992 | Shindou et al. ............. 428/623 |
| 5,104,929 A | 4/1992 | Bilkadi ....................... 524/847 |
| 5,212,216 A | 5/1993 | Hattori et al. .............. 523/415 |
| 5,236,995 A | 8/1993 | Salatin et al. ............... 524/591 |
| 5,264,486 A | 11/1993 | Piestert ........................ 524/745 |
| 5,334,420 A | 8/1994 | Hartung et al. .......... 427/407.1 |
| 5,342,882 A | 8/1994 | Gobel et al. ................. 524/832 |
| 5,368,915 A | 11/1994 | Ueda ........................ 428/423.1 |
| 5,370,910 A | 12/1994 | Hille et al. ............... 427/407.1 |
| 5,384,367 A | 1/1995 | Swarup et al. ............... 525/169 |
| 5,391,620 A | 2/1995 | Bederke et al. ............. 525/123 |
| 5,416,136 A | 5/1995 | Konzmann et al. ......... 523/414 |
| 5,418,264 A | 5/1995 | Obloh et al. ................. 523/414 |
| 5,438,083 A | 8/1995 | Takimoto et al. ........... 523/401 |
| 5,468,461 A | 11/1995 | Hosoda et al. .............. 523/435 |
| 5,474,811 A | 12/1995 | Rehfuss et al. .......... 427/407.1 |
| 5,512,322 A | 4/1996 | Hille et al. ............... 427/407.1 |
| 5,552,496 A | 9/1996 | Vogt-Birnbrich et al. ... 525/440 |
| 5,569,705 A | 10/1996 | Vogt-Birnbrich et al. ... 524/591 |
| 5,571,861 A | 11/1996 | Klein et al. ................. 524/591 |
| 5,576,386 A | 11/1996 | Kempter et al. ............... 526/88 |
| 5,601,880 A | 2/1997 | Schwarte et al. ........ 427/407.1 |
| 5,623,016 A | 4/1997 | Klein et al. ................. 524/591 |
| 5,654,391 A | 8/1997 | Gobel et al. ................. 528/71 |
| 5,658,617 A | 8/1997 | Gobel et al. ............. 427/372.2 |
| 5,690,569 A | 11/1997 | Ledvina et al. .............. 474/111 |
| 5,691,419 A | 11/1997 | Engelke et al. ............. 525/208 |
| 5,691,425 A | 11/1997 | Klein et al. ................. 525/455 |
| 5,726,258 A | 3/1998 | Fischer et al. ................. 526/64 |
| 5,760,128 A | 6/1998 | Baltus et al. ................ 524/591 |
| 5,977,256 A | 11/1999 | Huybrechts et al. ........ 525/131 |
| 6,001,424 A | 12/1999 | Lettmann et al. ........ 427/407.1 |

(List continued on next page.)

FOREIGN PATENT DOCUMENTS

| | | |
|---|---|---|
| CA | 2073115 | 7/1992 |
| CA | 2102169 | 5/1994 |
| CA | 2079498 | 8/2001 |

(List continued on next page.)

OTHER PUBLICATIONS

English Language Abstract for DE 198 11 471.
English Language Abstract for DE 19924172.
English Language Abstract for WO 00/32670.

(List continued on next page.)

Primary Examiner—Erma Cameron

(57) ABSTRACT

The invention provides a method of obtaining improvements in the appearance of articles having both vertically and horizontally orientated surfaces and a coating composition for use in said method. The coating composition of the invention has a film-forming component (a) and a rheology control agent (b) having substantially colorless, substantially inorganic microparticles (i) and a compound (ii) comprising the reaction product of an amine and an isocyanate. A particularly preferred method of the invention requires applying the coating composition of the invention to an article having at least one horizontally orientated surface and at least one vertically orientated surface so as to provide a coated horizontally orientated surface and a coated vertically orientated surface, wherein the coated vertically orientated surface has improved sag resistance, most preferably having a sag resistance of at least 1.2 mils. The coated surfaces are then cured to provide a cured horizontally orientated film having an improved surface appearance, most preferably a surface appearance having a DOI of at least 70.

22 Claims, No Drawings

U.S. PATENT DOCUMENTS

| | | | |
|---|---|---|---|
| 6,001,915 A | 12/1999 | Schwarte et al. | 524/457 |
| 6,111,001 A | 8/2000 | Barancyk et al. | 524/211 |
| 6,309,707 B1 | 10/2001 | Mayer et al. | 427/386 |
| 6,329,020 B1 | 12/2001 | Patzschke et al. | 427/407.1 |
| 6,403,699 B1 | 6/2002 | Rockrath et al. | 524/556 |
| 6,410,646 B1 | 6/2002 | Rockrath et al. | 525/124 |

FOREIGN PATENT DOCUMENTS

| | | |
|---|---|---|
| CA | 2102170 | 8/2001 |
| DE | 4328092 | 2/1995 |
| DE | 4423260 | 1/1996 |
| DE | 19811471 | 9/1999 |
| DE | 19924170 | 11/2000 |
| DE | 19924171 | 11/2000 |
| DE | 19924172 | 11/2000 |
| DE | 199 24 172 | 11/2000 |
| DE | 10118532 | * 10/2002 |
| EP | 0 008 127 A | 3/1981 |
| EP | 0 038 127 A1 | 3/1981 |
| EP | 192 304 A | 2/1986 |
| EP | 0 245 700 B | 4/1987 |
| EP | 0 245 700 A2 | 4/1987 |
| EP | 0 249 201 A3 | 6/1987 |
| EP | 0 261 863 | 9/1987 |
| EP | 0 276 501 A2 | 9/1987 |
| EP | 0 299 148 A2 | 4/1988 |
| EP | 0 354 261 A1 | 8/1988 |
| EP | 0 358 153 B1 | 9/1989 |
| EP | 0 394 747 A1 | 4/1990 |
| EP | 0 401 565 A1 | 5/1990 |
| EP | 0 424 705 A2 | 10/1990 |
| EP | 0 531 510 B1 | 3/1992 |
| EP | 0 590 484 A1 | 9/1993 |
| EP | 0 624 577 A | 5/1994 |
| EP | 0 624 577 A2 | 5/1994 |
| EP | 0 708 788 B1 | 6/1994 |
| JP | 60120750 | 12/1983 |
| JP | 01-024851 | * 1/1989 |
| WO | WO82/12387 | 7/1982 |
| WO | WO92/22615 | 12/1992 |
| WO | WO94/22968 | 10/1994 |
| WO | WO95/14721 | 6/1995 |
| WO | WO95/27742 | 10/1995 |
| WO | WO96/12747 | 5/1996 |
| WO | WO97/12945 | 4/1997 |
| WO | WO97/49745 | 12/1997 |
| WO | WO97/49747 | 12/1997 |

OTHER PUBLICATIONS

English Language Abstract for WO 99/05194.
English Language Abstract for DE 44 23 260.
Database WPI, Derwent Publications Ltd., London, GB; Class A12, AN 1982–01817J XP002145613 & SU 899 614 B(CHEM IND RES DES IN), Jan. 23, 1982.

BASF English Patent Application No. 09/926,526 filed Nov. 14, 2001, entitled Coating material Featuring a mixture comprising at least one wetting agent and ureas and/or derivatives as thixotropic agents, pp. 1–60.

BASF CORP., U.S. patent application Ser. No. 09/926,518, entitled "Thixotropic Agent", pp. 1–47.

Patent Abstract of Japan, JP09203115, MITSUBISHI Gas Chem Co. Inc., by Kono Yutaka, entitled "Printing Ink Binder", Jul. 29, 1997 on 1 page.

Patent Abstract of Japan JP62179221, MITSUI TOATSU CHEM INC., Sugita Toshio, entitled "Thixotropic polyurethane composition", vol. 013, No. 205, Jan. 26, 1989 on 1 page.

Baumgart, et al, U.S. patent application Ser. No. 09/926,533 filed Nov. 16, 2001, entitled Coating material featuring a mixture comprising silicas and urea and/or derivatives, pp. 1–50.

BASF English Patent Application No. 08/513,925 filed Sep. 28, 1995, Issued as Patent No. 6,403,699 Entitled "Non-aqueous coating and producing a two–coat finish", pp. 1–20 and the Abstract on 2 pages.

BASF English Patent Application No. 09/856,773 filed Nov. 15, 1998, Entitled "Coating composition and process its preparation" pp. 1–49 and Abstract. (IN–5498).

BASF English Patent Application No. 09/463,054 filed Jul. 13, 1998, Entitled "Coating composition and process its preparation", pp. 1–51 and Abstract.

Patent Abstract of Japan, vol. 009, No. 271 (c–311), Oct. 29, 1985.

International Search Report PCT/US 02/04588 filed Apr. 2, 2002.

English Abstract for DE 19924172, Nov. 30, 2000.

Dres. Fitzner & Münch Letter of Jun. 8, 2000.

English Translation on front page of the International Publication WO94/22968, Oct. 1994.

BASF Corp. et al., U.S. patent application Ser. No. 09/926,533, Nov. 16, 2001, Entitled "Coating Material Containg a Mixture of Silicic Acids and Urea and/or Urea Derivatives," pp. 1–50.

English Translation on front page of the International Publication WO92/22615, Dec. 1992.

English Translation on front page of the International Publication WO95/01421, Jun. 1995.

DE 43 28 092 English Abstract, Feb. 1995.

DE4421823 English Abstract, Jan. 1996.

BASF Corporation et al., EP 0 708 788, May 1996.

English Translation on front page of the International Publication WO96/12747, May 1996.

* cited by examiner

METHOD OF IMPROVING THE APPEARANCE OF COATED ARTICLES HAVING BOTH VERTICAL AND HORIZONTAL SURFACES, AND COATING COMPOSITIONS FOR USE THEREIN

FIELD OF THE INVENTION

The invention relates to curable coating compositions containing rheology modifiers and methods of using the same. More particularly, the invention relates to methods of coating articles, including a preferred method for coating articles having both vertically and horizontally orientated surfaces using coating compositions containing a particular rheology control agent.

BACKGROUND OF THE INVENTION

Composite color-plus-clear coatings are widely utilized in the coatings art. They are particularly desirable where exceptional gloss, depth of color, distinctness of image, and/or special metallic effects are required.

As used herein, the term "composite color-plus-clear" relates to composite coating systems requiring the application of a first coating, typically a colored basecoat coating, followed by the application of a second coating, generally a clearcoat, over the noncured or "wet" first coating. The applied first and second coatings are then cured. Thus, such systems are often described as "wet on wet" or "two-coat/one bake". Drying processes that fall short of complete cure may be used between the application of the coatings.

Color-plus-clear systems are often selected when an exterior coating must possess an optimum visual appearance as well as superior durability and weatherability. As a result, the automotive industry has made extensive use of color-plus-clear composite coatings, especially for automotive body panels. Minimum performance requirements for clearcoat coating compositions intended for use on automotive body panels include high levels of adhesion, scratch and mar resistance, chip resistance, humidity resistance, and weatherability as measured by QUV and the like. The clearcoat composition must also be capable of providing a visual appearance characterized by a high degree of gloss, distinctness of image (DOI), and smoothness. Finally, such coatings must also be easy to apply in a manufacturing environment and be resistant to application defects.

Clearcoats used in color-plus-clear systems are normally applied at film builds significantly higher than the film builds at which the colored basecoat is applied. Such higher clearcoat film builds are an aspect of the system that contributes toward the desired appearance and/or durability of the overall color-plus-clear system. For example, automotive original equipment manufacturing (OEM) facilities typically apply clearcoat compositions at wet film builds of from 0.8 to 6.0 mils to provide cured clearcoat film builds of from 0.5 to 3.5 mils. In contrast, the colored basecoat compositions are usually applied at wet film builds of from 0.2 to 4.0 mils to provide cured basecoat film builds of from 0.1 to 2.0 mils.

Unfortunately, the higher film build requirement for clearcoats can exacerbate the tendency of a clearcoat composition to sag. Occurring primarily on vertically orientated surfaces, sag may be described as the undesirable downward flow of an applied coating. Often manifesting as drips or runs, sag is sometimes attributed to the "too heavy" or "too wet" application of a coating. Ideally, a commercially successful clearcoat composition will have an inherent tendency to resist sagging regardless of application and/or facility parameters. The more resistant a clearcoat is to sagging on vertically orientated surfaces, the easier it will be to apply in an automotive OEM facility.

However, a clearcoat resistant to vertically orientated sagging has traditionally shown increased resistance to flow on horizontally orientated surfaces. "Vertically orientated" as used herein refers to surfaces which are substantially parallel to the direction of gravity, i.e., at an angle of $90°\pm45°$ relative to the surface of the earth, more preferably at an angle of $90°\pm30°$ relative to the surface of the earth. "Horizontally orientated" refers to surfaces which are substantially perpendicular to the direction of gravity, i.e., at an angle of $180°\pm45°$ relative to the surface of the earth, more preferably at an angle of $180°\pm30°$ relative to the surface of the earth.

A coating composition's resistance to flow on horizontally orientated surfaces often results in "orange peel" and/or an overall unacceptable appearance in terms of the smoothness, gloss and DOI of the resulting cured film. Orange peel may be described as a reoccurring irregularity in the surface of a cured film resulting from the inability of an applied wet film to "level out" after application. Although an orange peeled cured film may feel smooth to the touch, it appears as a continuous series of small bumps or dimples. The greater the inability of an applied wet film to "level out" or flow, the more pronounced or defined the small bumps or dimples will appear to the observer. The presence of such surface irregularities make it particularly difficult to obtain a smooth, glossy coated clearcoated surface having a high DOI rating.

The prior art has attempted to provide coating compositions having improved rheology.

U.S. Pat. No. 4,522,958 to Das et al., discloses an essentially solvent-based, organic, high-solids coating composition containing (A) a film-forming binder system containing a crosslinkable resin having a weight average molecular weight of from about 500 to about 10,000; (B) substantially colorless, substantially inorganic microparticles stabley dispersed in the coating composition; and (C) a solvent system for the crosslinkable resin. The inorganic microparticles prior to incorporation in the coating composition range in size from about 1 to about 150 nanometers and are in the form of a sol of the microparticles in which carbon-containing molecules are chemically bonded to the inorganic microparticles at the surface of the microparticles.

U.S. Pat. No. 5,468,461 discloses an anticorrosive primer composition comprising (1) 100 parts by weight of an epoxy resin having a number-average molecular weight of from 500 to 10,000, (2) from 10 to 60 parts by weight of an aromatic polyamine containing from 2% to 30% by weight, based on the aromatic polyamine, of a promoter selected from the group consisting of phenol compounds and cresol compounds, (3) from 10 to 60 parts by weight of a polyisocyanate, (4) from 10 to 40 phr, based on the sum of components (1), (2), and (3), of silica particles of colloidal silica or fumed silica or a mixture of these, (5) from 0.5 to 5 phr of a lubricant, and (6) an organic solvent. The composition is particularly suitable for use to apply onto the chromate coating of a chromated, zinc-plated steel sheet.

U.S. Pat. Nos. 4,311,622, 4,677,028 and 4,851,294 disclose sag control agents that are the reaction products of an amine and a diisocyanate optionally reacted in the presence of a resinous binder. These sag control agents are typically crystalline in nature and their effectiveness is dependent on the size and shape of the crystals as well as their concentration.

U.S. Pat. No. 6,111,001 discloses compositions comprised of (a) a polymer containing pendant and/or functional groups selected from the group consisting of carbamate, urethane and/or amide functional groups, and (b) a rheology modifier comprising the reaction product of an amine and an isocyanate; and, optionally, a polymer which is different from the polymer (a) which contains carbamate, urethane and/or amide functional groups. Also disclosed are curable compositions comprised of the compositions described above which further comprise (c) a curing agent having functional groups reactive with the functional groups of the polymer (a). The curable compositions are taught to be useful for a variety of applications such as adhesives, sealants and surface coatings where the presence of a carbamate, urethane and/or amide functional polymer in conjunction with the rheology modifier provides improved thixotropy and superior sag resistance.

However, all of the foregoing have been unable to provide coating compositions having a desirable balance between vertically orientated sag resistance and horizontal orientated rheology and flow.

As a result, there continues to be a need for coating compositions which, while providing all of the required durability characteristics, have superior resistance to sagging on vertically orientated surfaces but still possess acceptable flow and leveling on horizontally orientated surfaces.

It is thus an object of the invention to provide a coating composition that is resistant to sagging on vertically orientated surfaces but possesses acceptable flow on horizontally orientated surfaces.

It is another object of the invention to provide a clearcoat coating composition which provides the desired vertical and horizontal surface rheology and flow but which also provides acceptable cured film performance properties.

It is another object of the invention to provide a clearcoat coating composition which provides the desired vertical and horizontal surface rheology and flow as well as desirable environmental etch performance.

SUMMARY OF THE INVENTION

These and other objects have been met with the instant inventions. The invention provides a coating composition having a film-forming component (a) and a rheology control agent (b) having substantially colorless, substantially inorganic microparticles (i) and a compound (ii) comprising the reaction product of an amine and an isocyanate.

In a broad aspect of the invention, the invention provides a method of coating an article. Said method requires the application of the coating composition of the invention to a surface of the article to provide a coated surface. The coated surface is then cured to provide a cured film.

In a more preferred method of the invention, the article to be coated will have at least one horizontally orientated surface and at least one vertically orientated surface. The coating composition of the invention is applied to said article so as to provide a coated horizontally orientated surface and a coated vertically orientated surface. Per the method of the invention the resulting coated vertically orientated surface will have an improved sag resistance, most preferably of at least 1.2 mils. The article having said coated surfaces is then cured to provide a cured horizontally orientated film having an improved surface appearance, most preferably having a DOI of at least 70.

DETAILED DESCRIPTION OF THE PREFERRED EMBODIMENT

The coating compositions of the invention have a film-forming component (a) and a rheology control agent (b). The rheology control agent (b) comprises substantially colorless, substantially inorganic microparticles (i) and a compound (ii) comprising the reaction product of an amine and an isocyanate.

While not wishing to be bound to a particular theory, it is believed that the improved rheology control of the coating composition of the invention results from the use of the new rheology control agent (b). The previously unachievable balance of vertical sag control and horizontal flow is believed to result from the specific combination of the substantially colorless, substantially inorganic microparticles (i) and a compound (ii) that is the reaction product of an amine and an isocyanate. As illustrated by the examples below, the use of the specific rheology control agent (b) of the invention provides improvements unattainable with the use of either compound (i) or compound (ii) alone.

The substantially colorless, substantially inorganic microparticles (i) of the invention will generally have an average diameter in the range of from about 1.0 to about 1000 nanometers (i.e., from about 1.0 to about 1000 millimicrons), preferably from about 2 to about 200 nanometers, and most preferably from about 4 to about 50 nanometers.

The substantially inorganic microparticles may be discrete or associated through physical and/or chemical means into aggregates. While discrete, nonagglomerated particles are preferred, it will be appreciated that many suitable inorganic microparticles will be associated into agglomerates or aggregates comprised of individual particles. As a result, any given sample of an otherwise suitable inorganic microparticle will generally have agglomerated particles falling into a range of particle sizes, some of which may or may not be within the above ranges. Irregardless, the individual particles comprising such agglomerates or aggregates will have average diameters within the range of from about 1 to about 150 nanometers, preferably from about 2 to 200 nanometers, and most preferably from about 4 to about 50 nanometers.

The microparticles suitable for use as component (b)(i) of the present invention include compounds that are substantially inorganic. The substantially inorganic microparticles can, for example, comprise a core of essentially a single inorganic oxide such as silica in colloidal, fumed, amorphous form, or alumina, or an inorganic oxide of one type on which is deposited an inorganic oxide of another type.

Suitable examples of substantially inorganic microparticles include a variety of small-particle, fumed silicas having an average diameter of particle agglomerates ranging from about 1 to about 250,000 nanometers (nm), preferably from about 1000 to about 150,000 nm, more preferably from about 3000 to about 75,000 nm and most preferably 5000 to 40,000 nm, which silicas have been surface modified during and/or after the particles are initially formed, as well as sols thereof. Such small particle fumed silicas are readily available, are essentially colorless, and have refractive indices which make them suitable for combination with a variety of crosslinkable resins and solvent systems so as to form substantially colorless transparent coating compositions when the coating compositions are free of dyes and pigments.

The silica particles prior to chemical modification of the surface generally may have a surface area ranging from about 20 to about 3000 square meters per gram ($m^2/g$), preferably from about 30 to about 3000 $m^2/g$, more preferably from about 60 to about 850 $m^2/g$, and most preferably less than 150 $m^2/g$. In a particularly preferred embodiment, the inorganic microparticles, most preferably fumed silica, will have a surface area of no more 135 m$^2$/g, and most preferably of from 90 to 135 m$^2$/g.

Silica oxides are a preferred material for use as component (b)(i), with fumed silicas being most preferred.

A preferred type of microparticles are those having surfaces onto which carbon-containing molecules have been incorporated. Such carbon-containing molecules are typically chemically bonded to the inorganic microparticles through covalent or ionic bonds. Such chemical modification of the inorganic microparticle surface renders the particle essentially hydrophobic and essentially organophilic. Suitable types of fumed silicas will generally have carbon contents of less than 8.0%. Preferred fumed silicas are those having a carbon content of less than 4.0%, more preferably from 0.1 to less than 3.0%, and most preferably in the range of from 0.5 to 2.0% or less.

Suitable inorganic microparticles may contain in addition to the chemically bonded carbon-containing moieties, such groups as anhydrous SiO$_2$ groups, SiOH groups, various ionic groups physically associated or chemically bonded within the surface of the inorganic microparticle, adsorbed organic groups, and combinations thereof depending on the particular characteristics of the inorganic microparticles desired.

The inorganic microparticles suitable for use in the coating compositions of the invention will be essentially colorless so as not to seriously interfere with the light transmissive characteristics of the coating compositions when unpigmented.

The substantially inorganic microparticles used as starting material for incorporation in the coating composition should be in a form suitable for dispersion into the coating composition or a component thereof. In a preferred aspect of the invention, the inorganic microparticles (b)(i) will be dispersed into a media prior to incorporation into the coating composition of the invention. The purpose of dispersion is to reduce the overall agglomerate particle size. Such agglomerates will most preferably be reduced to an average agglomerate particle size approaching the size of the individual particles of the inorganic microparticles. However, in practice, reduction of agglomerates to an average agglomerate particle size of from 1000 to 100,000 nm, preferably 1000 to 40,000 nm, and most preferably 5000 to 30,000 nm is acceptable.

Examples of suitable dispersing media include polymers and resins which are the same or different as the film-forming component (a). Most preferably, the inorganic microparticles (b)(i) will be dispersed into a portion of one or more of the components of the film-forming component (a). Other suitable dispersing media include aqueous media, inert materials, and the like. Sols, both organosols and hydrosols, are considered to be dispersions of the inorganic microparticles (b)(i).

After dispersion, the substantially inorganic microparticles must possess sufficient storage stability so as not to prevent the use of the coating composition for its intended purpose. For example, it is within the scope of the invention for a coating composition containing the rheology control agent (b) to settle, so long as any settled portions can be redispersed utilizing conventional paint mixing techniques.

Sols of such silicas can be prepared by a variety of techniques and in a variety of forms, examples of which include aquasols, organosols, and mixed sols. As used herein the term "mixed sols" is intended to include those dispersions of fumed silica in which the dispersing medium comprises both an organic liquid and water.

In a most preferred embodiment, the inorganic microparticles (i) will be a fumed silica having an average surface area of from 90 to 135 m$^2$/g and a carbon content of less than 2.0%.

Compound (ii) of the rheology control agent (b) is the reaction product of an amine and an isocyanate.

Suitable amines may contain one or more amino groups, but preferably the amine is a monoamine. The monoamines employed are preferably primary monoamines, particularly preferably araliphatic or aliphatic primary monoamines and most preferably, aliphatic primary monoamines having at least 6 carbon atoms in the molecule.

Suitable monoamines include benzylamine, ethylamine, n-propylamine, isopropylamine, n-butylamine, isobutylamine, tert-butylamine, pentylamine, hexylamine, n-octylamine, nmethylbutylamine, ethylpropylamine and ethylbutylamine. Additionally, hydroxy containing monoamines may be used such as 2-aminoethanol, 1-aminoethanol, 2-aminopropanol, 3-aminopropaol, 1-amino-2-propanol, 2-amino-2-methylpropanol, 2-aminobutanol, 2-amino-2-methyl-1,3-propanediol, and 2-amino-2-ethyl-1,3-propanediol. Examples of other suitable amines for use in the preparation of the rheology modifier are those described in U.S. Pat. Nos. 4,311,622 and 4,677,028. Preferably, the monoamine is benzylamine or hexylamine, with hexylamine being most preferred.

The isocyanates useful in the preparation of the compound (ii) are preferably monomeric isocyanates, more preferably, di- or tri-isocyanates. The polyisocyanate can be an aliphatic, cycloaliphatic or aromatic polyisocyanate, or mixtures thereof. Diisocyanates are preferred, although higher polyisocyanates such as triisocyanates can be used either in place of or in combination with diisocyanates.

Examples of the aliphatic isocyanates are trimethylene, tetramethylene, tetramethylxylylene, pentanethylene, hexamethylene, 1,2-propylene, 1,2-butylene, 2,3-butylene, and 1,3-butylene diisocyanates. Also suitable are cycloaliphatic isocyanates such as 1,3-cyclopentane and isophorone diisocyanates aromatic isocyanates such as m-phenylene, p-phenylene and diphenylmethane-4,4-diisocyanate; aliphatic-aromatic isocyanates such as 2,4- or 2,6-tolulene diisocyanate and 1,4-xylylene diisocyanate; nuclear-substituted aromatic isocyanates such as dianisidine diisocyanate and 4,4-diphenylether diisocyanate; triphenylmethane-4,4,4-triisocyanate, and 1,3,5-triisocyanatobenzene; and dimers and trimers of polyisocyanates such as the isocyanurate of tolulene diisocyanate and hexamethylene diisocyanate. Isothiocyanates corresponding to the above-described isocyanates, where they exist, can be employed as well as mixtures of materials containing both isocyanate and isothiocyanate groups. Isocyanates are commercially available from Bayer U.S.A., Inc. under the trademarks MONDUR and DESMODUR. Preferably the polyfunctional monomeric isocyanate is 1,6-hexamethylene diisocyanate. Examples of suitable isocyanates are described in U.S. Pat. Nos. 4,311,622 and 4,677,028.

The equivalent ratio of amine to isocyanate ranges from 0.7 to 1.5:1, preferably 1:1, with primary amine being considered monofunctional. In a particularly preferred emodiment, the compound (ii) will be crystalline.

Generally, the compound (ii) may be formed by reacting the amine with the isocyanate in a suitable reaction vessel generally at a temperature between 20° C. and 80° C., preferably from 20° C. to 50° C. in the presence of a diluent. In carrying out the reaction, it is preferred that the isocyanate is added to the amine in the reaction vessel. The reaction product, which preferably has been dispersed in a suitable solvent, may then be added to one or more polymers of the film-forming component (a) described below in accordance with the present invention.

In one embodiment of the invention, the rheology control agent (b) is prepared in the presence of one or more of the film-forming components (a).

Rheology control agent (b) will generally be comprised of from 0.10 to 99.9% by weight of inorganic microparticles (i) and from 99.90 to 0.10% by weight of compound (ii), all based on the total weight of rheology control agent (b). In a preferred embodiment of the invention, rheology control agent (b) will have from 20.00 to 99.90% by weight of inorganic microparticles (i) and from 80.00 to 0.10% by weight of compound (ii). More prefeably, rheology control agent (b) will comprise from 40.00 to 85.00% by weight of inorganic microparticles and from 60.00 to 15.00% by weight of compound (ii). More particularly, the rheology control agent (b) will more preferably consist essentially of, and most preferably will consist of, from 40.00 to 85.00% by weight of inorganic microparticles and from 60.00 to 15.00% by weight of compound (ii).

Rheology control agent (b) will generally be present in the coating compositions of the invention in an amount of from 0.1 to 10.0, preferably from 0.1 to 7.0, more preferably from 1.0 to 5.0, and most preferably from 1.5 to 3.5, all based on the % nonvolatile of the film-forming component (a) and the % nonvolatile of any film-forming components present in inorganic microparticles (i) and compound (ii), that is, the total % nonvolatile of the film-forming components of the invention.

The film-forming component (a) of the invention may be polymeric or oligomeric and will generally comprise one or more compounds or components having a number average molecular weight of from 900 to 1,000,000, more preferably from 900 to 10,000. Compounds comprising film-forming component (a) will generally have an equivalent weight of from 114 to 2000, and more preferably 250 to 750. Most preferably, the coating composition of the invention will be a curable thermosetting coating wherein film-forming component (a) comprises a component (a)(i) having a plurality of active hydrogen-containing functional groups and a curing agent (a)(ii) having functional groups reactive with those of component (a)(i). It will be appreciated that the coating compositions of the invention may be one component or two component coating compositions. In the later case, the rheology control agent (a) may be in either component but will most preferably be in the component containing film-forming component (a)(i).

Film-forming component (a) may be present in the coating composition in amounts of from 0 to 90%, preferably from 1 to 70%, and most preferably from 5 to 40%, all based on the fixed vehicle solids of the coating composition, i.e., % nonvolatile (NV) of all film-forming components, i.e., component (a) as well as any film-forming components present as a result of rheology control agent (b). In the most preferred embodiment, film-forming component (ai) will be present in an amount of from 1 to 99, more preferably from 40 to 90, and most preferably from 60 to 90, all based on the % NV of all film-forming components. Likewise, film-forming component (aii) will be present in an amount of from 1 to 99, more preferably from 10 to 60, and most preferably from 10 to 40, all based on the % NV of all film-forming components.

One or more film-forming components (ai) will comprise one or more active hydrogen groups. "Active hydrogen group" as used herein refers to functional groups which donate a hydrogen group during the reaction with the functional groups of compounds (aii). Examples of active hydrogen groups are carbamate groups, hydroxyl groups, amino groups, thiol groups, acid groups, hydrazine groups, activated methylene groups, and the like. Preferred active hydrogen groups are carbamate groups, hydroxyl groups, and mixtures thereof.

Such active hydrogen group containing polymer resins include, for example, acrylic polymers, modified acrylic polymers, polyesters, polyepoxides, polycarbonates, polyurethanes, polyamides, polyimides, and polysiloxanes, all of which are well-known in the art. Preferably, component (ai) is a polymer selected from the group consisting of acrylic, modified acrylic, polyester and/polyurethane polymers. More preferably, the polymer is an acrylic or polyurethane polymer.

In one preferred embodiment of the invention, the polymer comprising component (ai) is an acrylic. The acrylic polymer preferably has a molecular weight of 500 to 1,000,000, and more preferably of 1500 to 50,000. As used herein, "molecular weight" refers to number average molecular weight, which may be determined by the GPC method using a polystyrene standard. Such polymers are well-known in the art, and can be prepared from monomers such as methyl acrylate, acrylic acid, methacrylic acid, methyl methacrylate, butyl methacrylate, cyclohexyl methacrylate, and the like. The active hydrogen functional group, e.g., hydroxyl, can be incorporated into the ester portion of the acrylic monomer. For example, hydroxy-functional acrylic monomers that can be used to form such polymers include hydroxyethyl acrylate, hydroxybutyl acrylate, hydroxybutyl methacrylate, hydroxypropyl acrylate, and the like. Aminofunctional acrylic monomers would include t-butylaminoethyl methacrylate and t-butylaminoethylacrylate. Other acrylic monomers having active hydrogen functional groups in the ester portion of the monomer are also within the skill of the art.

Modified acrylics can also be used as component (ai) according to the invention. Such acrylics may be polyester-modified acrylics or polyurethane-modified acrylics, as is well-known in the art. Polyester-modified acrylics modified with ε-caprolactone are described in U.S. Pat. No. 4,546,046 of Etzell et al, the disclosure of which is incorporated herein by reference. Polyurethane-modified acrylics are also well-known in the art. They are described, for example, in U.S. Pat. No. 4,584,354, the disclosure of which is incorporated herein by reference.

Preferred carbamate functional acrylics useful as component (ai) can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, 5,356,669, and WO 94/10211, the disclosures of which are incorporated herein by reference. One method of synthesis involves reaction of a hydroxy ester with urea to form the carbamyloxy carboxylate (i.e., carbamate-modified acrylic). Another method of synthesis reacts an α,β-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing one or more polymers or oligomers useful as film-forming component (ai) is to react an already-formed polymer such as an acrylic polymer with another component to form a carbamate-functional group appended to the polymer backbone, as described in U.S. Pat. No. 4,758,632, the disclosure of which is incorporated herein by reference. Another technique for preparing polymers useful as film-forming component (ai) involves thermally decomposing urea (to give off ammonia and HNCO) in the presence of a hydroxy-functional acrylic polymer to form a carbamate-functional acrylic polymer. Another technique involves reacting the hydroxyl group of a hydroxyalkyl carbamate with the isocyanate group of an isocyanate-functional acrylic or vinyl monomer to form a carbamate-functional acrylic. Isocyanate-functional acrylics are known in the art and are described, for example in U.S. Pat. No. 4,301,257, the disclosure of which is incorporated herein by reference. Isocyanate vinyl monomers are well known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the most preferred carbamate-functional acrylic. Cyclic carbonate-functional acrylic polymers are known in the art and are described, for example, in U.S. Pat. No. 2,979,514, the disclosure of which is incorporated herein by reference. Another technique is to transcarbamylate a hydroxy-functional acrylic polymer with an alkyl carbamate. A more difficult, but feasible way of preparing the polymer would be to trans-esterify an acrylate polymer with a hydroxyalkyl carbamate.

Such preferred polymers useful as film-forming component (ai) will generally have a number average molecular weight of 2000–20,000, and preferably from 3000–6000. The carbamate content of the polymer, on a molecular weight per equivalent of carbamate functionality, will generally be between 200 and 1500, and preferably between 300 and 500. It will be appreciated that the glass transition temperature, $T_g$, of film-forming components (ai) and (aii) can be adjusted to achieve a cured coating having the $T_g$ for the particular application involved.

Preferred carbamate functional acrylic film-forming components (ai) can be represented by the randomly repeating units according to the following formula:

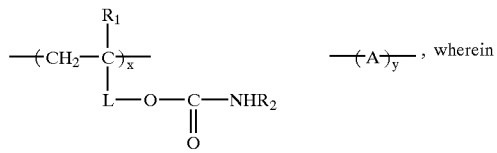

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix.

The values x and y represent weight percentages, with x being 10 to 90% and preferably 40 to 60%, and y being 90 to 10% and preferably 60 to 40%.

In the formula, A represents repeat units derived from one or more ethylenically unsaturated monomers. As previously discussed, such monomers for copolymerization with acrylic monomers are known in the art. Preferred such monomers will include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

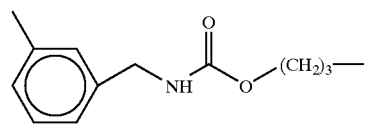

$—(CH_2)—$, $—(CH_2)_2—$, $—(CH_2)_4—$, and the like. In one preferred embodiment, $—L—$ is represented by $—COO—L'—$ where L' is a divalent linking group. Thus, in a preferred embodiment of the invention, the polymer component (a) is represented by randomly repeating units according to the following formula:

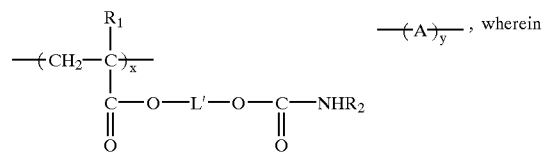

In this formula, $R_1$, $R_2$, A, x, and y are as defined above. L' may be a divalent aliphatic linking group, preferably of 1 to 8 carbon atoms, e.g., $—(CH_2)—$, $—(CH_2)_2—$, $—(CH_2)_4—$, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an $—NHCOO—$ urethane linkage as a residue of the isocyanate group.

A most preferred carbamate and hydroxyl functional polymer for use as film-forming component (ai) will have a number average molecular weight of from 1000 to 5000, a carbamate equivalent weight of from 300 to 600, and a Tg of from 0° to 150° C. In an especially preferred embodiment, the carbamate-functional polymer will have a number average molecular weight of from 1500 to 3000, a carbamate equivalent weight of from 350 to 500, and a Tg of from 25 to 100° C.

This most preferred carbamate functional polymer for use as film-forming component (ai) will have from at least 66 to 100% by weight, based on the total weight of the polymer, of one or more repeat units A" selected from the group consisting of:

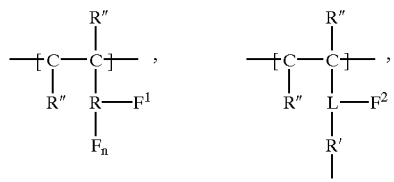

and mixtures thereof, and from 0 to less than 35% by weight, based on the total weight of the polymer, of one or more repeat units A' having the structure:

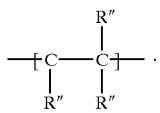

More preferably, this most preferred carbamate functional polymer for use as film-forming component (ai) will have from 80 to 100 weight percent of one or more repeat units A" and from 20 to 0 weight percent of one or more repeat units A', and most preferably, from 90 to 100 weight percent of one or more repeat units A" and from 10 to 0 weight percent of one or more repeat units A', based on the total weight of the final carbamate functional polymer. A particularly preferred carbamate functional polymer of the invention will have more than 90 weight percent of one or more repeat units A" and less than 10 weight percent, preferably between 1 and 9 weight percent, of one or more repeat units A', based on the total weight of the carbamate functional polymer of the invention.

In the above, R is an at least divalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable R groups are aliphatic or cycloaliphatic linking groups of from 1 to 60 carbons, aromatic linking groups of from 1 to 10 carbons, and mixtures thereof. Preferred R groups include aliphatic or cycloaliphatic groups of from 2 to 10 carbons. R may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

Examples of particularly preferred R groups are set forth below. Note that $F^1$ is not part of R but is shown in the structures below to provide perspective.

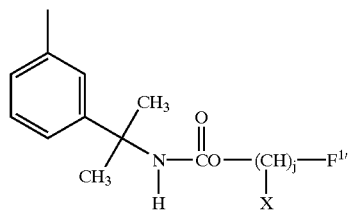

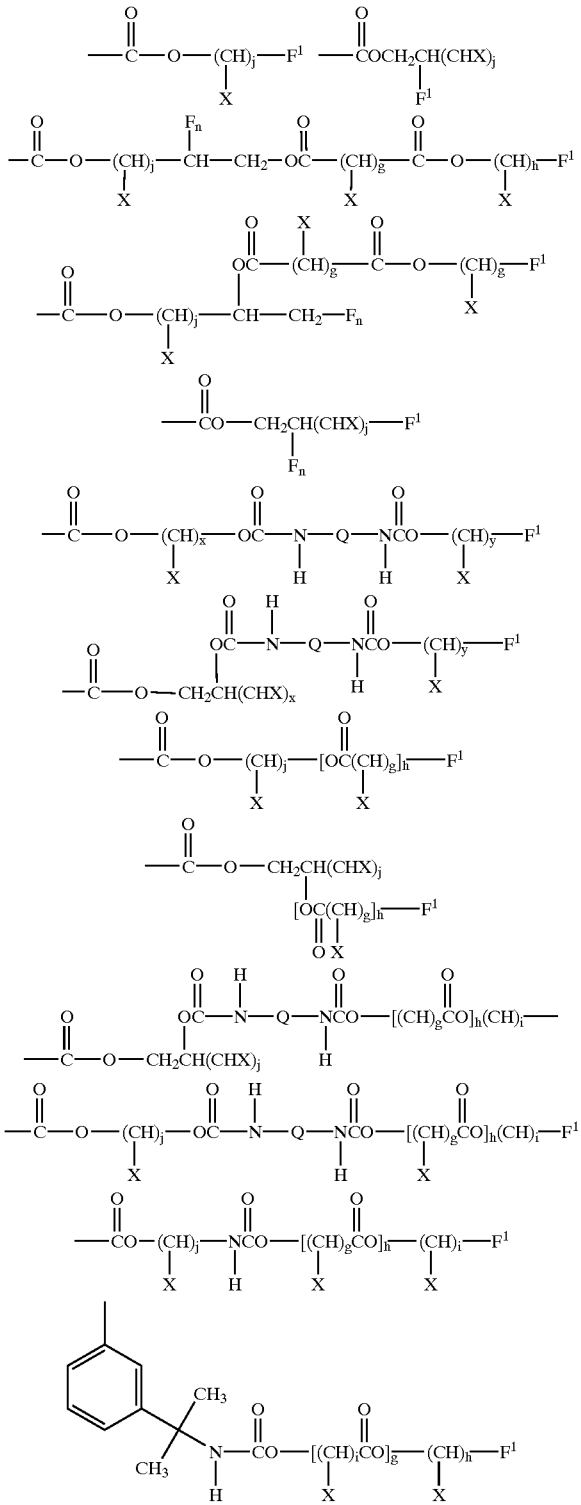

and isomers thereof, wherein X is H or is a monovalent nonfunctional linking group having from 1 to 20 carbon atoms and from 0 to 20 heteroatoms selected from the group consisting of oxygen, nitrogen, sulfur, phosphorus, and silane, and mixtures thereof; i, j, g, and h are intergers from 0 to 8; and Q is an at least divalent nonfunctional linking group having from 1 to 60 carbon atoms and from 0 to 20 heteroatoms selected from the group consisting of oxygen, nitrogen, sulfur, phosphorus, and silane, and mixtures thereof A most preferred R group is

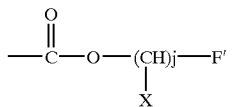

wherein j is from 1 to 6 and X is as defined above.

R' is an at least monovalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable R' groups are aliphatic or cycloaliphatic linking groups of from 1 to 60 carbons, aromatic linking groups of from 1 to 10 carbons, and mixtures thereof. Preferred R' groups include aliphatic or cycloaliphatic groups of from 2 to 10 carbons. R' may, and preferably will, include one or more heteroatoms via one or more divalent internal linking groups such as esters, amides, secondary carbamates, ethers, secondary ureas, ketones, and mixtures thereof. The use of esters as internal linking groups is most preferred.

Examples of particularly preferred R' groups are

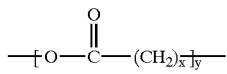

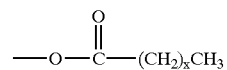

wherein x and y are from 0 to 10, preferably from 3 to 8.

In a preferred embodiment, the at least monovalent nonfunctional linking group R' will comprise at least one branched alkyl group of from 5 to 20 carbons, preferably from 5 to 15 carbons and most preferably from 8 to 12 carbons. An example of an especially suitable structure for incorporation into linking group R' is

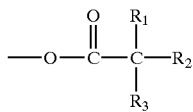

wherein $R_1$, $R_2$, and $R_3$ are alkyl groups of from 1 to 10 carbons each. Most preferably, $R_1$, $R_2$, and $R_3$ will total from 8 to 12 carbons with at least one of $R_1$, $R_2$, and $R_3$ being a methyl group. In a most preferred emodiment, n will be 0 when R' comprises this branched alkyl structure.

R" is H or a monovalent nonfunctional having from 1 to 20 carbon atoms and from 0 to 20 heteroatoms selected from the group consisting of oxygen, nitrogen, sulfur, phosphorus, and silane, and mixtures thereof.

Illustrative examples of suitable R" groups are hydrogen, aliphatic or cycloaliphatic linking groups of from 1 to 60 carbons, aromatic linking groups of from 1 to 10 carbons, and mixtures thereof. R" may, and preferably will, include one or more heteroatoms via one or more divalent internal linking groups such as esters, amides, secondary carbamates, ethers, secondary ureas, ketones, and mixtures thereof.

Preferred R" groups are H, —$CH_3$, aromatic groups such as benzyl, and alkyl esters of from 2 to 10 carbons, especially from 4 to 8 carbons. H and methyl are most preferred as R".

L is an at least trivalent nonfunctional linking group having from 1 to 60 carbon atoms and from 0 to 20 heteroatoms selected from the group consisting of oxygen, nitrogen, sulfur, phosphorus, and silane, and mixtures thereof. As used here, "nonfunctional" refers to the absence of groups which are reactive with crosslinking agents under traditional coating curing conditions.

Illustrative examples of suitable L groups are aliphatic or cycloaliphatic linking groups of from 1 to 60 carbons, aromatic linking groups of from 1 to 10 carbons, and mixtures thereof. Preferred L groups include aliphatic or cycloaliphatic groups of from 2 to 10 carbons. L may, and preferably will, include one or more heteroatoms via one or more divalent internal linking groups such as esters, amides, secondary carbamates, ethers, secondary ureas, ketones, and mixtures thereof. Internal linking groups selected from the group consisting of esters, secondary carbamates, and mixtures thereof, are more preferred, with esters being most preferred.

An example of preferred L groups are

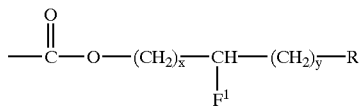

and isomers thereof, wherein $F^1$ and R are as described, x and y may the same or different and are from 0 to 10, preferably from 1 to 3, and is most preferably 1.

F, $F^1$ and $F^2$ are functional groups selected from the group consisting of primary carbamate groups, hydroxyl groups, and mixtures thereof, such as beta-hydroxy primary carbamate groups, with the proviso that at least one of $F^1$ and $F^2$ are a primary carbamate group or a beta-hydroxy primary carbamate group, and n is an integer from 0 to 3, most preferably 0.

Polyesters having active hydrogen groups such as hydroxyl groups can also be used as the film-forming component (ai) in the coating composition according to the invention. Such polyesters are well-known in the art, and may be prepared by the polyesterification of organic polycarboxylic acids (e.g., phthalic acid, hexahydrophthalic acid, adipic acid, maleic acid) or their anhydrides with organic polyols containing primary or secondary hydroxyl groups (e.g., ethylene glycol, butylene glycol, neopentyl glycol).

Carbamate functional polyesters are also suitable for use as film-forming component (ai) in the coating compositions of the invention. Suitable polyesters can be prepared by the esterification of a polycarboxylic acid or an anhydride thereof with a polyol and/or an epoxide. The polycarboxylic acids used to prepare the polyester consist primarily of monomeric polycarboxylic acids or anhydrides thereof having 2 to 18 carbon atoms per molecule. Among the acids that are useful are phthalic acid, hexahydrophthalic acid, adipic acid, sebacic acid, maleic acid, and other dicarboxylic acids of various types. Minor amounts of monobasic acids can be included in the reaction mixture, for example, benzoic acid, stearic acid, acetic acid, and oleic acid. Also, higher carboxylic acids can be used, for example, trimellitic acid and tricarballylic acid. Anhydrides of the acids referred to above, where they exist, can be used in place of the acid. Also, lower alkyl esters of the acids can be used, for example, dimethyl glutarate and dimethyl terephthalate.

Polyols that can be used to prepare suitable polyesters (ai) include diols such as alkylene glycols. Specific examples include ethylene glycol, 1,6-hexanediol, neopentyl glycol, and 2,2-dimethyl-3-hydroxypropyl-2,2-dimethyl-3-hydroxypropionate. Other suitable glycols include hydrogenated Bisphenol A, cyclohexanediol, cyclohexanedimethanol, caprolactone-based diols such as the reaction product of e-caprolactone and ethylene glycol, hydroxy-alkylated bisphenols, polyether glycols such as poly(oxytetramethylene)glycol, and the like.

Although the polyol component can comprise all diols, polyols of higher functionality can also be used. It is preferred that the polyol be a mixture of at least one diol; and at least one triol, or one polyol of higher functionality. Examples of polyols of higher functionality would include trimethylol ethane, trimethylol propane, pentaerythritol, and the like. Triols are preferred. The mole ratio of polyols of higher functionality to diol is generally less than 3.3/1, preferably up to 1.4/1.

Carbamate groups can be incorporated into the polyester by first forming a hydroxyalkyl carbamate that can be reacted with the polyacids and polyols used in forming the polyester. A polyester oligomer can be prepared by reacting a polycarboxylic acid such as those mentioned above with a hydroxyalkyl carbamate. An example of a hydroxyalkyl carbamate is the reaction product of ammonia and propylene carbonate. The hydroxyalkyl carbamate is condensed with acid functionality on the polyester or polycarboxylic acid, yielding terminal carbamate functionality. Terminal carbamate functional groups can also be incorporated into the polyester by reacting isocyanic acid with a hydroxy functional polyester. Also, carbamate functionality can be incorporated into the polyester by reacting a hydroxy functional polyester with urea.

Carbamate groups can also be incorporated into the polyester by a transcarbamalation reaction. In this reaction, a low molecular weight carbamate functional material derived from a low molecular weight alcohol or glycol ether such as methyl carbamate is reacted with the hydroxyl groups of a hydroxyl functional polyester, yielding a carbamate functional polyester and the original alcohol or glycol ether. The low molecular weight carbamate functional material derived from an alcohol or glycol ether is first prepared by reacting the alcohol or glycol ether with urea in the presence of a catalyst. Suitable alcohols include lower molecular weight aliphatic, cycloaliphatic, and aromatic alcohols such as methanol, ethanol, propanol, butanol, cyclohexanol, 2-ethylhexanol, and 3-methylbutanol. Suitable glycol ethers include ethylene glycol methyl ether and propylene glycol methyl ether. Propylene glycol methyl ether is preferred.

Besides carbamate functionality, polyester polymers and oligomers suitable for use as film-forming component (ai) may contain other functional groups such as hydroxyl, carboxylic acid and/or anhydride groups. The equivalent weight of such polyesters containing terminal carbamate groups maybe from about 140 to 2500, based on equivalents of carbamate groups. The equivalent weight is a calculated value based on the relative amounts of the various ingredients used in making the polyester, and is based on the solids of the material.

Polyurethanes having active hydrogen functional groups such as described above which are suitable for use as film-forming component (ai) are also well known in the art. They are prepared by a chain extension reaction of a polyisocyanate (e.g., hexamethylene diisocyanate, isophorone diisocyanate, MDI, etc.) and a polyol (e.g., 1,6-hexanediol, 1,4-butanediol, neopentyl glycol, trimethylol propane). They can be provided with active hydrogen functional groups by capping the polyurethane chain with an excess of diol, polyamine, amino alcohol, or the like.

Carbamate functional polyurethanes may be prepared by reacting the active hydrogen groups with a low molecular weight carbamate functional material derived from a low molecular weight alcohol or glycol ether such as methyl.

Other carbamate functional compounds preferred for use as film-forming component (ai) are carbamate-functional compounds which are the reaction product of a mixture comprising a polyisocyanate or a chain extended polymer, and a compound comprising a group that is reactive with isocyanate or a functional group on the chain extended polymer as well as a carbamate group or group that can be converted to carbamate. Such compounds are described in U.S. Pat. No. Nos. 5,373,069 and 5,512,639 hereby incorporated by reference.

Finally, film-forming component (ai) may also be a water dispersible resin having an active hydrogen containing group as described above.

In a most preferred embodiment, film-forming component (ai) will be selected from the group consisting of carbamate functional acylics, carbamate functional modified acrylics, hydroxyl functional acrylics, hydroxyl functional modified acrylics, polyurethanes, polyesters and mixtures thereof, with carbamate functional acylics, hydroxyl functional acrylics, and carbamate/hydroxyl functional acrylics as described above being especially preferred.

The coating compositions of the invention may also comprise a curing agent or crosslinking agent (aii) having functional groups which are reactive with the active hydrogen containing functional groups of the one or more film-forming components (ai). Such reactive crosslinking groups include active methylol or methylalkoxy groups on aminoplast crosslinking agents or on other compounds such as phenol/formaldehyde adducts, isocyanate groups, siloxane groups, cyclic carbonate groups, and anhydride groups. Examples of illustrative curing agents (aii) include melamine formaldehyde resin (including monomeric or polymeric melamine resin and partially or fully alkylated melamine resin), blocked or unblocked polyisocyanates (e.g., TDI, MDI, isophorone diisocyanate, hexamethylene diisocyanate, and isocyanurate trimers of these, which may be blocked for example with alcohols or oximes), urea resins (e.g., methylol ureas such as urea formaldehyde resin, alkoxy ureas such as butylated urea formaldehyde resin), polyanhydrides (e.g., polysuccinic anhydride), and polysiloxanes (e.g., trimethoxy siloxane). Aminoplast resin such as melamine formaldehyde resin or urea formaldehyde resin are especially preferred for use as curing agent (aii).

One or more solvents may be utilized in the coating composition of the present invention. Such one or more solvents will preferably act as solvents with respect to both film-forming components (ai) and (aii). In general, depending on the solubility characteristics of film-forming components (ai) and (aii), the solvent can be any organic solvent and/or water.

In one preferred embodiment, the solvent is a polar organic solvent. More preferably, the solvent is a polar aliphatic solvents or polar aromatic solvents. Still more preferably, the solvent is a ketone, ester, acetate, aprotic amide, aprotic sulfoxide, or aprotic amine. Examples of useful solvents include methyl ethyl ketone, methyl isobutyl ketone, m-amyl acetate, ethylene glycol butyl ether-acetate, propylene glycol monomethyl ether acetate, xylene, N-methylpyrrolidone, or blends of aromatic hydrocarbons.

In another preferred embodiment, the solvent is water or a mixture of water with small amounts of co-solvents.

The coating compositions of the invention may also include a catalyst to enhance the cure reaction. For example, when aminoplast compounds, especially monomeric melamines, are used as component (aii), a strong acid catalyst may be utilized to enhance the cure reaction. Such catalysts are well-known in the art and include, for example, p-toluenesulfonic acid, dinonylnaphthalene disulfonic acid, dodecylbenzenesulfonic acid, phenyl acid phosphate, monobutyl maleate, butyl phosphate, and hydroxy phosphate ester. Strong acid catalysts are often blocked, e.g. with an amine. Other catalysts that maybe useful in the composition of the invention include Lewis acids, zinc salts, and tin salts.

In a preferred embodiment of the invention, the solvent is present in the coating compositions of the invention in an amount of from about 0.01 weight percent to about 99 weight percent, preferably from about 10 weight percent to about 60 weight percent, and more preferably from about 30 weight percent to about 50 weight percent.

Additional agents may also be used in the coating compositions of the invention, for example, surfactants, fillers, stabilizers, wetting agents, dispersing agents, adhesion promoters, UV absorbers, HALS, etc. It will be appreciated that while such agents may be known in the prior art, the amount used must be controlled to avoid adversely affecting the finished film performance characteristics.

It will be appreciated that the coating compositions of the invention may be pigmented or substantially unpigmented, i.e., transparent. In a most preferred embodiment, the coating compositions of the invention will be clearcoat coating compositions, i.e., transparent and substantially unpigmented. However, it is within the scope of the invention that the rheology control agent (b) be used in pigmented coating compositions used as basecoat or topcoat coating compositions, especially high-gloss embodiments thereof. When the coating compositions of the invention are used as a pigmented paint coating, the pigment may be any organic or inorganic compounds or colored materials, fillers, metallic or other inorganic flake materials such as mica or aluminum flake, and other such materials as are normally included in such coatings. Pigments and other insoluble particulate compounds such as fillers are usually used in the composition in an amount of 1% to 100%, based on the total solid weight of binder components (i.e., a pigment-to-binder ratio of 0.1 to 1).

The coating compositions can be coated on desired articles by any of a number of techniques well known in the art. These include, for example, spray coating, dip coating, roll coating, curtain coating, and the like. For automotive body panels, spray coating is preferred.

The coating compositions of the invention may be applied may be applied to a wide variety of substrates, especially those typically encountered in the transportation/automotive industries. Illustrative examples include metal substrates such as steel, aluminum, and various alloys, flexible plastics, rigid plastics and plastic composites.

In a particularly preferred embodiment, the coating compositions of the invention will be applied to articles having at least one horizontally orientated surface and at least one vertically orientated surface. Examples of such articles include front and rear automotive fascias such as bumpers and the like, side facing exterior body panels and added automotive components.

The coating compositions of the invention containing the particularly preferred rheology control agent provide advantages in both applied noncured coatings and cured films.

For example, vertically orientated surfaces to which the coatings of the invention have been applied but not yet cured will show improvements in sag resistance. Coated vertically orientated surfaces made according to the method of the invention will generally have a sag resistance of 1.0 to 4.0 mils, preferably of at least 1.2 mils, more preferably 1.5 to 3.0 mils, and most preferably from between 1.6 to 2.2 mils.

Sag resistance is measured via the following test method. A 4×18 inch steel panel having seventeen ¼ inch holes arrayed down the center of the panel from top to bottom is first phosphated and then electrocoated. The coating composition to be evaluated is then spray applied in a wedge format such that the minimum film build is at the top of the panel with the film build increasing to the x maximum film build at the bottom of the panel. During application of the coating, the panel is at an angle of approximately 90° relative to the surface of the earth. Immediately after application of the coating, the coated panel is placed sideways, such that the seventeen holes continue to be 90° relative to the surface of the earth. The coated panel is flashed for two minutes in this position and then cured in the same position i.e., for example in a 285° F. oven for 20 to 25 minutes.

Evaluation of any resultant sagging or dripping is measured by drawing a line ¼ inch below the holes and noting the film build at which a sag touches the line. Film build is measured with a film build gage. Sag resistance in mils refers to the maximum film build which does not exhibit sagging.

Horizontally coated surfaces are cured to provide cured horizontally orientated films having a particular appearance. In general, appearance parameters of interest include DOI, gloss, appearance as measured by Wavescan and Autospect devices, color development, horizontal to vertical color shifting, sandscratch resistance, as well as fingerprint and dark spot resistance. Acceptable DOI values per ASTM D-5767 are from 65 to 100, with a DOI of at least 70 and higher being most preferred. Gloss ranges of at least 65 or more are preferred, with values of at least 70 to 100 being most preferred.

The coating compositions described herein are preferably subjected to conditions so as to cure the coating layers. Although various methods of curing may be used, heat-curing is preferred. Generally, heat curing is effected by exposing the coated article to elevated temperatures provided primarily by radiative heat sources.

Curing temperatures will vary depending on the particular blocking groups used in the cross-linking agents, however they generally range between 195° F. and 360° F. In a preferred embodiment, the cure temperature is preferably between 230° F. and 300° F., and more preferably at temperatures between 230° F. and 290° F. for a blocked acid catalyzed system. For an unblocked acid catalyzed system, the cure temperature is preferably between 175° F. and 212° F. The curing time will vary depending on the particular components used, and physical parameters such as the thickness of the layers, however, typical curing times range from 15 to 60 minutes, and preferably 15–25 minutes for blocked acid catalyzed systems and 10–20 minutes for unblocked acid catalyzed systems.

EXAMPLE 1

Preparation of a Clearcoat Composition Prepared According to the Invention and Comparative Clearcoat Compositions Carbamate functional acrylic/melamine based clearcoat compositions were generally prepared according to Example 2 of U.S. Pat. No. 5,726,246. Components (bi) and (bii) were added per Table 1. The levels of carbamate functional acrylic in all coatings were adjusted so as to be equivalent in view of any additional carbamate functional acrylic resin incorporated with the addition of component (bii).

TABLE 1

| Component % fixed vehicle | Clearcoat Composition | | | | |
|---|---|---|---|---|---|
| | A | B | C | D | E |
| (bi)[1] | 2.39 | 0.00 | 2.39 | 0.00 | 3.58 |
| (bii)[2] | 0.00 | 2.00 | 0.57 | 3.00 | 0.00 |

[1]A 1:1 blend of Aerosil ® R805, (a fumed silicas commerically available from Degussa of Frankfurt, Germany) and Cabosilc ® TS610, (a fumed silica commercially available from Cabot Alpharetta, GA)
[2]Setalux ® 10-9701, the reaction product of benzylamine and hexamethylene diisocyanate prepared in the presence of carbamate functional acrylic of Preparation 1 of U.S. Pat. No. 5,726,246, and commercially available from Akzo Nobel Resins of Louisville, KY.

EXAMPLE 2

Evaluation of Clearcoat Compositions A–E of Example 1

Test panels for evaluation of sag resistance were prepared by phosphating a 4×18 inch steel panel having 17¼ inch holes arrayed down the center of the panel from top to bottom with a commerically available phosphate treatment. The panels were electrocoated with U32AD310 electrocoat, commercially available from BASF Corporation of Southfield, Mich. Clearcoats A–E were then spray applied in a wedge format such that the greatest film build was at the bottom of the panel with the film build diminishing to the minimum film at the top of the panel. During application of the coating, the panel were placed at an angle of approximately 90° relative to the surface of the earth. Immediately after application of the coatings, the coated panels were positioned on their sides. The panels were flashed for two minutes while in this position and then placed in the same position in a 285° F. oven for 23 minutes.

Test panels for the evaluation of horizontal appearance were prepared by the spray application of a black acrylic/melamine based basecoat (E14KU012, commercially available from BASF Corporation of Southfield, Mich.) over 10"×10" phosphated and electrocoated steel panels. Basecoat was applied at a film build of from 0.4 to 0.8 mils. Clearcoats A–E were spray applied electrostatically with a Behr bell gun to a target film build of from 1.9 mils in two passes. The panels were then flashed for ten minutes and cured for 23 minutes in a 285° F. oven.

The horizontal test panels were evaluated as indicated in Table 2. Gloss was evaluted using a Micro Tri-Gloss 4525 glossmeter, commercially available from BYK Gardner, Silver Springs, Md., per ASTM D523. DOI was evaluated using a model D 47-6 DOI meter from Hunter Dorigon of Fairfax, Va., per ASTM D-5767. Wavescan measurements were performed on a Wave-scan Plus 4806 meter from BYK Gardner, per GM4364M, R values being the average of three readings. Autospect values were obtained using a Autospec meter model QMS BP, from Autospect of Ann Arbor, Mich. The Autospec value reflects gloss, DOI, and waviness. The reported Autospec number is the average of three readings.

TABLE 2

| Test Method | Clearcoat composition | | | | |
|---|---|---|---|---|---|
| | A | B | C | D | E |
| Sag Resistance (mils) | 1.6 | 1.6 | 1.9 | 1.9 | 1.9 |
| Sag Resistance (Observed) | Moderate | Moderate | Good | Good | Good |
| Gloss | 85 | 86 | 85 | 85 | 85 |
| DOI | 95 | 94 | 94 | 90 | 88 |
| Autospect | 65 | 65 | 65 | 60 | 60 |
| Wavescan | 7.8 | 7.5 | 7.7 | 6.5 | 6.0 |
| Horiz App (Observed) | Good | Good | Good | Moderate | Poor |

It can be seen that only clearcoat composition C according to the invention provides both desireable sag resistance and horizontal appearance.

What is claimed is:

1. A method of coating an article having at least one horizontally orientated surface end at least one vertically orientated surface, comprising
    providing a coating composition comprising:
        (a) at least one carbamate functional film-forming component, and
        (b) a rheology control agent comprising
            (i) substantially colorless, substantially inorganic microparticles which have been surface modified and have a surface area of from 20 to 3000 m$^2$/g before surface modification, and
            (ii) a compound comprising the reaction product of an isocyanate and at least one amine selected from the group consisting of benzylamine, ethylamine, n-propylamine, isopropylamine, n-butylamine, isobutylamine, tert-butylamine, pentylamine, hexylamine, n-octylamine, n-methylbutylamine, ethylpropylamine and ethylbutylamine,
    applying the coating composition to the at least one horizontally orientated surface and the at least one vertically orientated surface to provide a coated horizontally orientated surface and a coated vertically orientated surface, wherein the coated vertically orientated surface has a sag resistance of at least 1.2 mils, and curing the coated horizontally orientated surface and the coated vertically orientated surface to provide a cured horizontally orientated film and a cured vertically orientated film, wherein the cured horizontally orientated film has an DOI of at least 70.

2. The method of claim 1 wherein the rheology control agent comprises
    from 0.10 to 99.90 percent by weight of substantially colorless, substantially inorganic micropartioles (i), and
    from 99.90 to 0.10 percent by weight of a compound (ii) comprising the reaction product of an amine and en isocyanate, all based on the total weight of the rheology control agent (b).

3. The method of claim 2 wherein the rheology control agent (b) comprises:
    from 20.00 to 99.90 percent by weight of substantially colorless, substantially inorganic microparticles (i), and
    from 80.00 to 0.10 percent by weight of a compound (ii) comprising the reaction product of an amine and an isocyanate, all based on the total weight of the rheology control agent (b).

4. The method of claim 3 wherein the rheology control agent (b) comprises:

from 40.00 to 85.00 percent by weight of substantially colorless, substantially inorganic microparticles (i), and from 60.00 to 15.00 percent by weight of a compound (ii) comprising the reaction product of an amine and an isocyanate, all based on the total weight of the rheology control agent (b).

5. The method of claim 1 wherein the coating composition comprises from 0.1 to 10.0 percent by weight of the rheology control agent (b), based on the total weight nonvolatile of the film-forming component (a).

6. The method of claim 5 wherein the coating composition comprises from 1.0 to 5.0 percent by weight of the rheology control agent (b), based on the total weight nonvolatile of the film-forming component (a).

7. The method of claim 6 wherein the coating composition comprises from 1.0 to 3.5 percent by weight of the rheology control agent (b), based on the total weight nonvolatile of the film-forming component (a).

8. The method of claim 1 wherein the substantially colorless, substantially inorganic microparticles (i) are selected from the group consisting of fumed silica, colloidal silica, and mixtures thereof.

9. The method of claim 8 wherein the substantially colorless, substantially inorganic microparticles (i) are fumed silica.

10. The method of claim 9 wherein the substantially colorless, substantially inorganic micropartioles (i) are a fumed silica having a carbon content of less than 4.0% by weight.

11. The method of claim 10 wherein the substantially cordless, substantially inorganic microparticles (i) are a fumed silica having a carbon content of from 0.10 to 2.00% by weight.

12. The method of claim 9 wherein the substantially colorless, substantially inorganic microparticles (i) are a fumed silica having an average surface area of less than 150 m²/g.

13. The method of claim 9 wherein the substantially colorless, substantially inorganic microparticles (i) are a fumed silica having an average surface area of no more than 135 m²/g.

14. The method of claim 9 wherein the substantially colorless, substantially inorganic microparticles (i) are a fumed silica having an average surface area of from 90 to 135 m²/g and a carbon content of less than 2.0% by weight.

15. The method of claim 1 wherein the film-forming component (a) comprises (ai) an active hydrogen-containing component, and (aii) a curing agent comprising one or more functional groups reactive with component (ai).

16. The method of claim 15 wherein active hydrogen-containing component (ai) is selected from the group consisting of carbamate functional acrylics, hydroxyl and carbamate functional acrylics, and mixtures thereof.

17. The method of claim 16 wherein active hydrogen-containing component (ai) is represented by randomly repeating units according to:

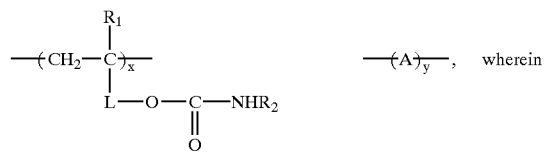

wherein R$_1$ is H or CH$_3$,
R$_2$ is H, alkyl, or cycloalkyl,
L is a divalent linking group,
x is a value from 10 to 90%,
y is a value from 90 to 10%, and
A represents repeat units derived from one or more ethylenically unsaturated monomers.

18. The method of claim 16 wherein active hydrogen-containing component (ai) comprises from at least 66 to 100% by weight, based on the total weight of component (ai), of one or more repeat units A" selected from the group consisting of:

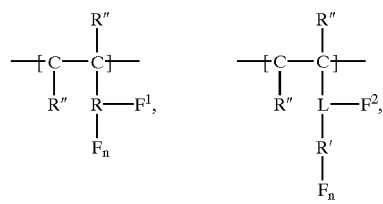

and mixtures thereof, and
from 0 to less than 35% by weight, based on the total weight of the polymer, of one or more repeat units A' having the structure:

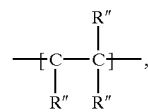

wherein
R is an at least divalent nonfunctional linking group having from 1 to 60 carbons atoms and from 0 to 20 heteroatoms selected from the group consisting of oxygen, nitrogen, sulfur, phosphorus, and silane, and mixtures thereof, R' is an at least monovalent nonfunctional linking group having from 1 to 60 carbons atoms and from 0 to 20 heteroatoms selected from the group consisting of oxygen, nitrogen, sulfur, phosphorus, and silane, and mixtures thereof, R" is H or a monovalent nonfunctional group having from 1 to 60 carbons atoms and from 0 to 20 heteroatoms selected from the group consisting of oxygen, nitrogen, sulfur, phosphorus, and silane, and mixtures thereof, L is a divalent nonfunctional linking group having from 1 to 60 carbons atoms and from 0 to 20 heteroatoms selected from the group consisting of oxygen, nitrogen, sulfur, phosphorus, and silane, and mixtures thereof, F, F$^1$ and F$^2$ are functional groups selected from the group consisting of primary carbamate groups, beta-hydroxy primary carbamate groups, hydroxyl groups, and mixtures thereof, with the proviso that at least one of $F^1$ and $F^2$ are a primary carbamate group or a beta-hydroxy primary carbamate group, and
n is an integer from 0 to 3.

19. The method of claim 15 wherein curing agent (aii) is selected from the group consisting of aminoplast resins, isocyanate functional resins, acid functional resins, and mixtures thereof.

20. The method of claim 19 wherein curing agent (aii) is selected from the group consisting of aminoplast resins, isocyanate functional resins, and mixtures thereof.

21. The method of claim 1 wherein the coating composition is a clearcoat composition.

22. The method of claim 1 wherein the coating composition is a pigmented basecoat composition.

* * * * *